United States Patent [19]

Lukis

[11] Patent Number: 4,679,241

[45] Date of Patent: Jul. 7, 1987

[54] METHOD AND APPARATUS FOR CORRECTING X-Y POSITION MEASUREMENTS

[75] Inventor: Lawrence J. Lukis, Prior Lake, Minn.

[73] Assignee: Moore Business Forms, Inc., Grand Island, N.Y.

[21] Appl. No.: 710,408

[22] Filed: Mar. 11, 1985

Related U.S. Application Data

[63] Continuation-in-part of Ser. No. 419,517, Sep. 17, 1982, abandoned, which is a continuation-in-part of Ser. No. 217,130, Dec. 17, 1980, abandoned.

[30] Foreign Application Priority Data

Mar. 17, 1981 [GB] United Kingdom ................. 8108288

[51] Int. Cl.$^4$ ........................... G06K 9/28; G06K 9/18
[52] U.S. Cl. ......................................... 382/13; 382/3; 178/18; 178/19
[58] Field of Search ...................... 178/18, 19; 382/13, 382/3

[56] References Cited

U.S. PATENT DOCUMENTS

| | | | |
|---|---|---|---|
| 3,793,469 | 2/1974 | Tarnopolsky et al. | 178/18 |
| 3,885,097 | 5/1975 | Pobgee | 178/18 |
| 4,018,989 | 4/1977 | Snyder et al. | 178/19 |
| 4,079,194 | 3/1978 | Kley | 178/18 |
| 4,444,998 | 4/1984 | House | 178/19 |
| 4,473,717 | 9/1984 | Parnell | 178/19 |
| 4,493,104 | 1/1985 | Lukis et al. | 178/18 |
| 4,608,658 | 8/1986 | Ward | 178/18 |

Primary Examiner—Leo H. Boudreau
Assistant Examiner—A. Anne Skinner
Attorney, Agent, or Firm—Allegretti, Newitt, Witcoff & McAndrews, Ltd.

[57] ABSTRACT

A two-dimensional coordinate measuring pad for use, for example, to recognize handwriting. A high resistivity sheet is bounded by a lower resistivity border connected to a switched voltage source to cause a current to flow first in one direction and then in a perpendicular direction through the resistive sheet. Potential measurements at an array of precisely predetermined points are employed to generate a set of correction values which are stored in a programmable read-only memory. Thereafter, to indicate the position of an arbitrarily selected contact point on the sheet, the stored correction values for the nearest points are fetched form the memory and combined with the measured values to produce adjusted output values which more accurately indicate the positional coordinates of the contact point.

4 Claims, 4 Drawing Figures

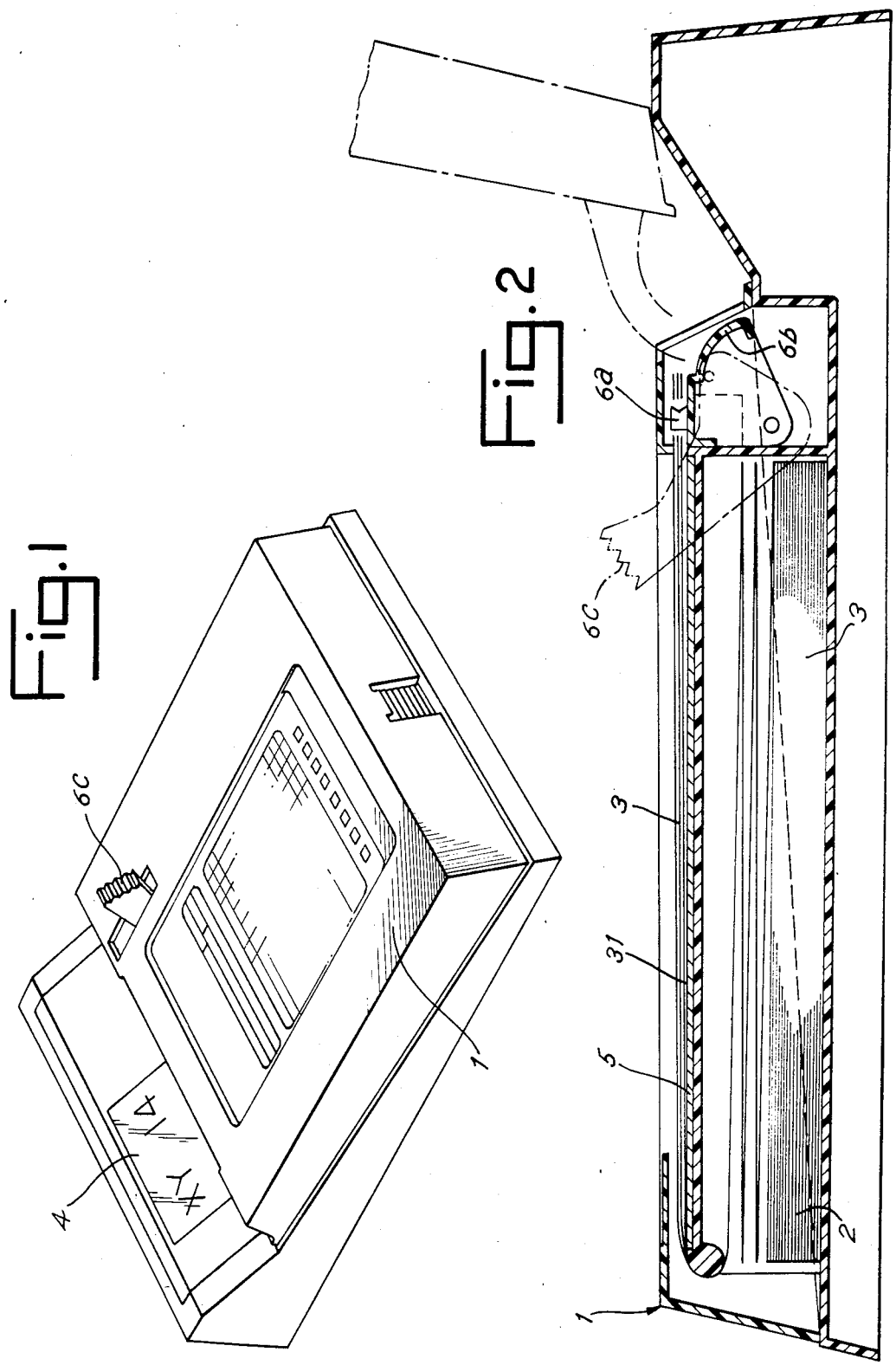

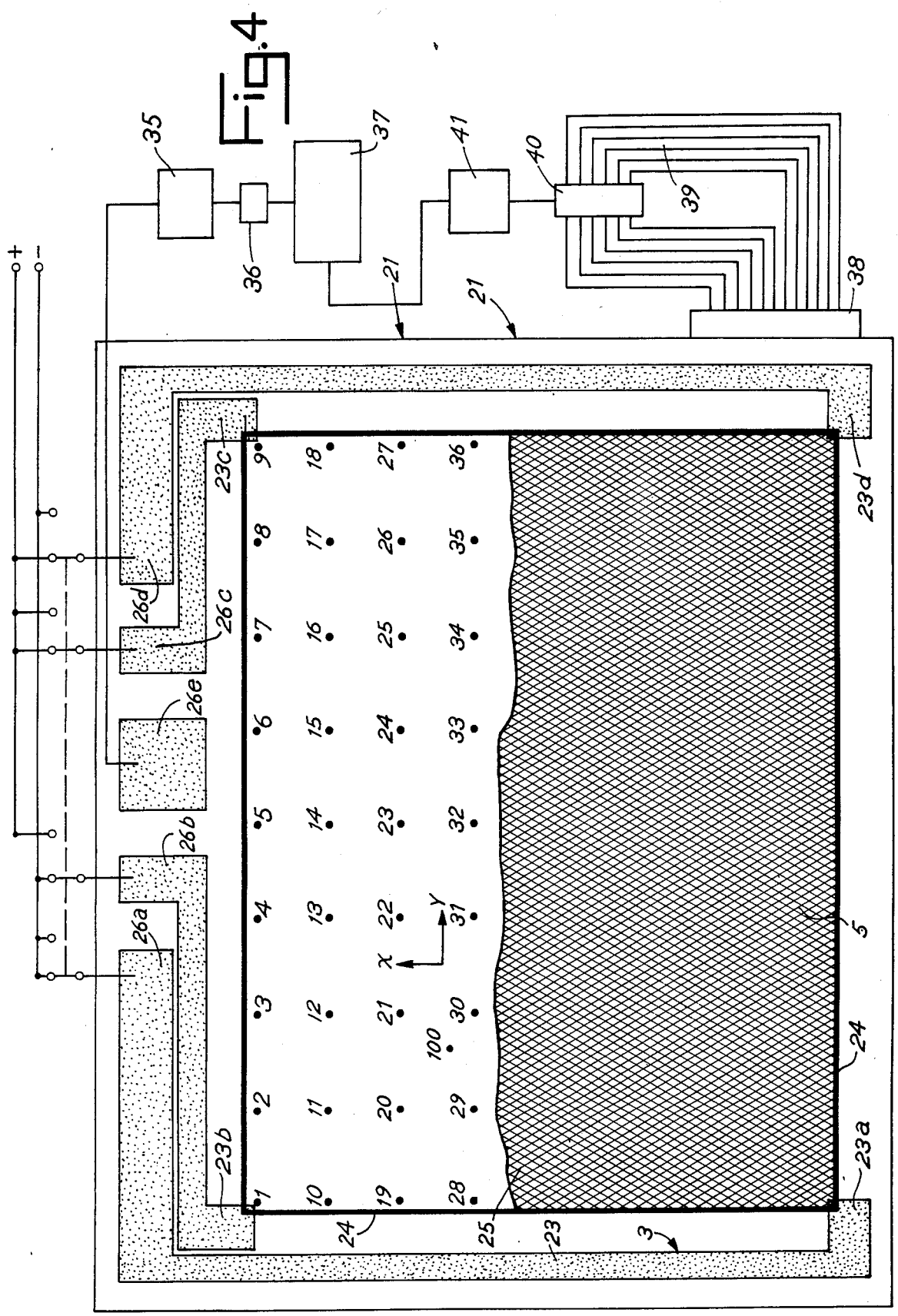

METHOD AND APPARATUS FOR CORRECTING X-Y POSITION MEASUREMENTS

REFERENCE TO RELATED APPLICATION

This application is a continuation-in-part of co-pending application Ser. No. 419,517, filed Sept. 17, 1982, entitled "Character Recognition Apparatus" now abandoned, which is a continuation-in-part of application Ser. No. 217,130, filed Dec. 17, 1980 now abandoned.

BACKGROUND OF THE INVENTION

Field of the Invention and Description of the Prior Art

This invention has reference to x-y position measuring devices for use, for example, in character recognition devices used, such as in connection with a writing machine, for example, an autographic register.

Writing machines have been marketed for many years and these have included autographic registers. The autographic register often comprises a casing including a compartment to receive a pack of folded interleaved continuous stationery webs and means to feed the continuous stationery web through the autographic register. The continuous stationery web consists of an uppermost web and one or more underlying copy record webs. Copy material such as, for example, carbon paper is interleaved between the uppermost web and the underlying copy record web or webs in order that data applied to the uppermost web can be reproduced on the underlying record web or webs. The webs are fed over a writing plate whereat the data is written by hand on the webs. Such data can record a business transaction but may record other data. When data has been recorded on the webs, a handle at one side of the machine is operated whereby one form length of the web is fed out of the register and the underlying part or parts are fed into a filing compartment where the webs are filed, refolded and stored. Portable autographic registers have also been marketed. Generally these portable registers comprise a compartment, in which the unused forms are stored, and a writing plate. In such portable registers the continuous stationery webs are pulled out of the storage compartment by hand by the operator over the writing plate and the individual form lengths of the business form continuous web are located in position by means, for example, of a pair of locating pins which engage with locating apertures at the leading end of each form length of the autographic register business form. One example of a portable autographic register is described in British Patent Specification No. 1293677.

It has also been proposed to provide a character recognition device for automatically recognizing characters as they are written. Thus, in the Specification of British Pat. No. 863,431 there is described apparatus for recording that a hand written character has been written on a supporting surface, an electrical circuit to be activated on movement of a writing instrument in writing the character, and means activated by the circuit for recording the written character. This apparatus may be incorporated in an autographic register or other apparatus for receiving hand writing.

The Specification of British Pat. No. 1,310,683 describes apparatus for obtaining signals representative of the co-ordinates of a point including a sheet of resistive material and an electric resistive member normally held out of contact with one another but capable of making temporary contact on an application by use, for example, of a writing implement and in which changeover means are provided to pass a current through the material and number, in alternative directions of right angles to one another, to derive signals representative of the co-ordinate of the point.

In the Specification of application for British Pat. No. 7943987 (European Application for Pat. No. 803045276.9; U.S. Ser. No. 217,130) there is described a character recognition apparatus having a writing pad comprising a pair of sheets normally electrically insulated from one another but adapted to be brought into contact with one another by writing pressure by a writing implement upon the writing pad, an electrical switching circuit to cause current to flow along the pad along two alternative paths, and a recognition circuit to recognize written characters by virtue of the changes in electrical voltage in the alternative paths, characterized in that one of the sheets of the writing pad comprises a central part of high resistivity and having a border of low resistivity so that the voltage gradient along the length of the pad is linear, and the other one of the sheets comprises a layer of conductive material.

SUMMARY OF THE INVENTION

It is an object of the present invention to provide for the calibration of a digitizing tablet used within an improved character recognition device capable of being associated with a writing machine in such a way that characters, hand writing on a business form in a character recognition device, may be readily recognized and processed.

Further purposes and objects will appear as the specification proceeds.

According to the present invention a two dimensional coordinate measuring pad for use, for example, to recognize hand writing, comprises a writing pad having a pair of sheets, one of which constitutes a high resistivity coating, the sheets being normally electrically insulated from one another but adapted to be brought into contact with one another by writing pressure by a writing implement upon the writing pad, an electrical switching circuit to cause current to flow through the pad along two alternate paths, and a recognition circuit to recognize the position of the application of the writing implement on the pad by virtue of the electrical voltages generated in the alternate paths, characterized in that there is associated with the high resistivity layer part of the pad, a programmable read only memory (ROM) integrated circuit and which integrated circuit contains data describing correction factors related to predetermined positions on the high resistivity layer, the correction factors being respectively accessed by a microprocessor to provide a correction to the position measured when a part of the pad to which that respective correction factor relates is operative.

BRIEF DESCRIPTION OF THE DRAWINGS

A character recognition device embodying an x-y position measuring pad in accordance with the present invention will now be described by way of example with reference to the accompanying drawings wherein:

FIG. 1 is a perspective view of a portable register embodying a character recognition device;

FIG. 2 is a sectional view of a portable register;

FIG. 4 is a plan view of one writing pad forming part of the character recognition device.

DETAILED DESCRIPTION OF THE PREFERRED EMBODIMENT

Figure 3:
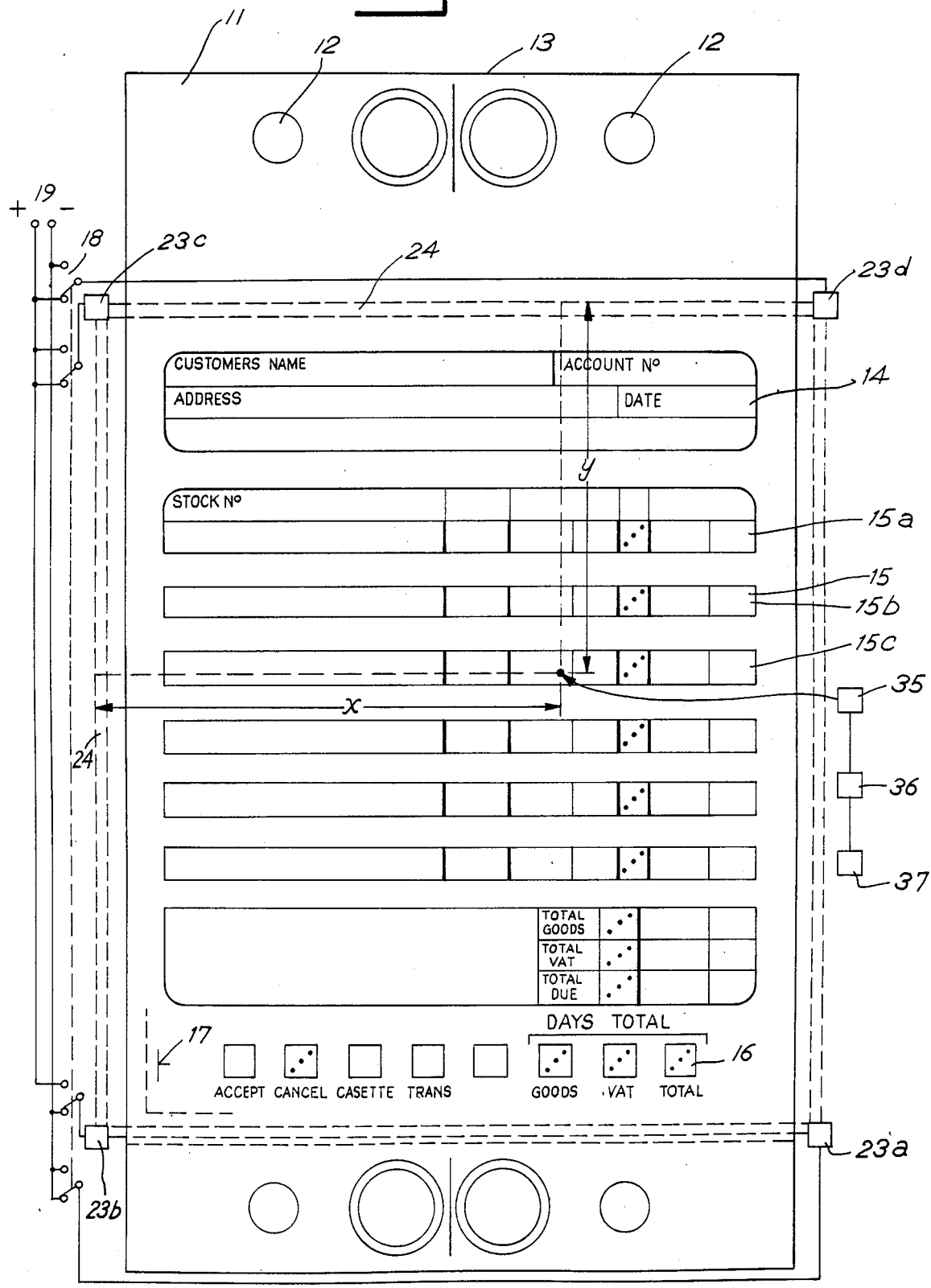
FIG. 3 is a view of a continuous stationery business form located in the character recognition device.

Referring to FIGS. 1 and 2 of the drawings, there is shown an autographic register 1 having a filing compartment 2 for housing a pack of interleaved continuous autographic register business forms webs 3. The webs are fed from the filing compartment 2 to a writing pad 5 by feed means 6. The feed means 6 comprises a pair of feed pins 6a which engage in a pair of apertures 12 adjacent to the leading end of respective form lengths of the continuous webs 3. The feed pins are mounted on a pivotal housing 6b which includes an operating lever 6c which projects through the casing of the register 1. Operation of the lever 6c serves to pull the webs through the register a sufficient distance so that the leading part of the leading form length of the web projects through an aperture in the register a sufficient distance so that the leading part may be gripped by the operator and the web pulled through the register manually. The web is pulled through the register until the apertures 12 in the next form length engage the pins 6a when the feeding of the web is halted.

A character recognition apparatus is associated with the writing pad 5 and a display unit 4 is positioned at the outfeed end of the register to display characters recognized by the recognition apparatus associated with the register and to display instructions to the register operator.

The character recognition apparatus includes a position measuring writing pad 5 comprising a pair of sheets, one having a resistive coating and the other being of conductive material. The sheets are normally separated from one another and capable of making temporary contact, one with the other to create an electrical circuit including the two sheets. The writing pad 5 is so arranged that, by virtue of the contact made between the two sheets, a circuit through the sheet can be made and hence the position of the point of contact between the two sheets can be determined by virtue of the voltage measured. Associated with the writing pad 5 is a voltage measuring means 35 associated with a converter current 36 and a series of character recognition circuits 37 which are programmed to serve to recognize characters written on the web 3.

Referring to FIG. 3 of the drawing, there is shown a form 11 of a continuous stationery business form with the leading part 13 of the following form length divided from the form length by a line of tear off perforations. The business form is made up of several similar interleaved parts, only one of which is shown in FIGS. 3 and 4, but are shown diagrammatically in FIG. 2. Each web of the business form is divided into form lengths and each form length has a pair of register apertures 12 adjacent its leading edge 13. The business form is fed out of the autographic register by means of feed pins which are operated by manual operation of a handle and by pulling the webs. Operation of the portable autographic register is more fully described in British Specification No. 1,293,677.

Each form length is of the same construction as the other form length and each form length is divided into predetermined writing areas 14, 15, and 16. As shown, the area 14 is an address area to receive details of a customer's name, address, account number, and the date. The area 15 is divided into several separate areas 15a, 15b, 15c etc., each of which is to receive details of a sales transaction, for example, to receive details of a stock number or description, details of quantity unit price, and total price of a commodity or commodities.

An additional sub-area 15a is provided to receive any special instructions as may be necessary to record, together with an area to receive details of the total value of the whole transaction, together with other miscellaneous information (Value Added Tax, etc.). A still further area 16 is to receive instructions related to the operation of the register. As shown, these instructions include an accept instruction, a cancel instruction, and a signal to a day's total instruction in order that the total goods sold in a day, the total of Value Added Tax due in a day's trading, and the total value of cash generated may be indicated.

On the left hand side of the area 16 is a graduation mark 17 consisting of a vertical line and a horizontal line which abuts the vertical line at its center point. The graduation mark 17 co-operates with a co-ordinated position recognizing apparatus to define the position of the graduation mark (to which a marking pressure is applied by a pencil or other writing implement), so that the position of the mark with respect to the writing pad 10 may be determined. The co-ordinated position recognizing apparatus will be hereinafter described.

It is arranged that the character recognition pad is positioned in spaced relationship with the feeding pins 6a in the register. The apertures on the business form are arranged in a predetermined relationship with the areas 14, 15, and 16 on each form length of business forms. Thus, when a form length is halted by the apertures coming into engagement with the feed pins 6a, the respective areas 14, 15 and 16 on the business form are arranged to overlie respective predetermined positions on the character recognition writing pad 5. When the form length is located in the predetermined halted position in relation to the writing pad 5 and the pressure is applied to the form to make a mark which is, for example, part of a character in a selected one of the areas 14, 15, and 16 to make an electrical contact between the two sheets of the character recognition pad 5, an electrical circuit is made through the two sheets. Thus, as shown in FIG. 3, the continuous web 3 is arranged in predetermined relationship with the apertures 12 which are aligned with the feed pins 6a in the autographic register. The feed pins 6a are arranged in predetermined relationship with the character recognition pad 5.

The writing pad 5 comprises a pair of spaced apart sheets, and the bottom sheet is connected by the electrodes to a respective appropriate switch 18 and to an electric supply 19.

Referring to FIG. 4 of the drawing, there is shown the lower layer of writing pad 5 including a rigid base board 21 of non-conducting material (such as that which is usually used as a base for printed circuit boards, for example, the material known as fiberglass), which serves as the mechanical supporting part of the writing pad. A layer of conductive connector material 23 is printed on the base board 21. The material of the conductive connector layer is applied in the form of an etched copper layer similar to that used on printed circuit boards or it may be applied as an ink which embodies silver particles to provide a coating having a resistance of about 0.01 ohms per square (and hereinafter referred to as a low resistance). The conductive connector coatings serve to connect the medium resistance borders (to be hereinafter described) to printed connectors 26a, 26b, 26c, and 26d at the top edge.

Printed on the top of the low resistance conductive connector layer 23 is a medium resistance border layer 24 which extends completely around the periphery of a higher resistance coating layer 25 (to be hereinafter described). The medium resistance border layer 24 overlaps the low resistance layer 23 at the corners thereof.

The medium resistance border layer has a width of between three hundredths and five hundredths of an inch (0.03" to 0.05") and may be printed from an ink embodying a mixture of silver and carbon particles to give a resistance to the order of one ohm per square. The medium resistance area is shown in black in FIG. 4 of the drawings.

A higher resistance coating 25 is printed on the board shown in FIG. 4 within the border formed by the border layer 24 but partially overlies the border layer 24, which coating 25 is shown in cross hatching. The high resistance coating layer 25 comprises a main rectangular part laying within the border layer 24.

The coating 25 which has a resistance of about 1000 ohms per square may be screen printed from an ink having conducting material (preferably carbon or silver) and a resin, a plasticizer and a solvent. This coating has a thickness of about 0.001".

The low resistance conductive layer 23 comprises a series of connector areas arranged at the top edge of the pad 5, as shown in FIG. 4, to an external circuit. As shown, the connector areas 26a, 26b, 26c and 26d are each positioned at one end of conductive leads which extend to the rectangular corner areas 23a, 23b, 23c and 23d, respectively, which are each adjacent the respective four corners of the rectangular resistive coating 25.

Each resistive layer 25 and each border layer 24 are formed by screen printing on the base board 21. The layers have a thickness of about 0.001" or even less. Pad 5 is more fully described in U.S. Ser. No. 329,807 now U.S. Pat. No. 4,493,104.

Positioned above the resistive layer 25 and separate therefrom is an easily replaceable layer 31 in FIG. 2 positioned in the area where writing pressure is applied. This cushion layer 31 is intended to prevent an electrical circuit being made when the operators hand rests on the writing surface and provide an electrical connection at the relatively high pressure point at the tip of the writing implement.

An electrical connection is made between the upper leaf layer and an electrical circuit external of the writing pad. This connection is made through the connector area 26e adjacent the areas 26b, 26c. The electrical connector is made from these respective areas 26a, 26b, 26c, 26d, to the electrical supply 19 and from the area 26e to the voltage measuring means 35.

An electrical switching circuit, as shown in FIG. 3, is provided whereby an electrical voltage is connected alternately between the connectors 26a, 26b and the voltage measuring means on the one hand and the connectors 26c, 26d and the voltage measuring means 35 on the other hand. By means of these connections, current is caused to flow through the resistive layer, first in one direction and then through the resistive layer in another direction at right angles to the first direction.

The writing pad so described constitutes a two-dimensional potentiometer by virtue of the alternate electric connections between the connectors 26b, 26c on the one hand and 26a, 26d on the other hand to make one electrical connection and also between the connectors 26b, 26a on the one hand and 26c, 26d on the other hand, to provide alternately generated voltages across the writing pad so that when an electric connection is made between the upper layer 31 and the main coating layer 25, a voltage is applied to the upper layer 31 representative of the co-ordinates of the point of contact on layer 25.

Referring to FIG. 3, there is shown a writing pad (shown in dotted lines) with an electrical DC voltage supply connected to the positive and negative terminals 19 and the terminals are connected to switches 18 and thence to the connector leads 26b, 26c, 26a, and 26d (FIG. 4). The switches 18 are ganged together so the switches operate together and are arranged so that the connector 26c and the rectangular area 23c are always connected to the positive supply and the connector 26a and the rectangular area 23a are always connected to the negative supply. Connectors 26b, 26d and areas 23b and 23d are alternately connected to the minus and the plus supply respectively in the switch down condition, wherein the x co-ordinate is measured, thence to the plus and minus respectively in the switch up condition, wherein the y co-ordinate is measured.

A connection is made from the conducting portion on the upper layer 31 to connector 26e and then to voltage measuring means 35. This voltage measuring means is adapted to read the voltage sensed by upper layer 31 at the point of contact by the writing implement which is representative of a co-ordinate of a point x, y. Thus, if a writing implement is recording a message on the writing pad at any one time the position of the writing implement may be represented by two voltages.

The voltage measuring means 35 is connected to an A/D converter 36 and a character processor 37 is arranged to recognize characters in accordance with the changes in the voltages corresponding to the distances x and y hereinbefore referred to.

Although we have shown the ganged switches 18 as being of the mechanical kind, these switches can be electronic switches.

It is desirable that the voltage drop across the high resistance coating layer 25 shall be linear but if there are irregularities in the coating, for example, caused by variations in the thickness of the coatings 24 and 25, the voltage drop may not be accurately linear. To accommodate for these irregularities, an integrated circuit 38 is used as a component on the writing pad 5. The integrated circuit 38 includes a series of corrector factors related to predetermined positions on a high resistivity layer 25 which corrector factors are respectively rendered operative to provide a correction signal when a part of the pad to which that respective corrector factors relates is operative.

As shown in FIG. 4, the high resistivity layer 25 is divided into areas surrounding a series of points. The layer is provided with nine lines of points, each line having nine points. As shown in FIG. 4, there are three lines of points 1 to 9; 10 to 18; and 19 to 27. These lines are distributed evenly across the pad. The high resistivity coating 25 on the pad is contacted by a matrix of a plurality of sensing pins, e.g., a "bed of nails" test fixture (not shown in the drawings). These pins are arranged in precise predetermined positions with nine lines of pins, each line having nine pins and the pins correspond in position with the points 1 to 9; 10 to 18; etc. as shown in FIG. 4. Improved accuracy may be obtained by increasing the number of reference points.

When switch 18 is closed to provide a voltage drop in one of the two dimensional directions, the voltages are measured at each of the 81 locations corresponding to each of the pins contacting the board. Because of the accurate location of the pins, the expected voltages at each location are known. The actual measured voltages may be compared to these expected voltages, and a correction factor may be computed corresponding to the actual and expected voltage measurements. These correction factors are burned into the corresponding locations in the programmable read only memory (PROM). Switch 18 then is opened in that dimensional direction and closed in the other dimensional direction which is at right angle to the first direction, and the procedure is repeated to burn the correction factors in that direction into the PROM in 38.

The interface 41 is connected to the character processor 37 so that, when a particular part of the character recognition pad 5 is being written upon, correctional factors stored in memory in 38 are called to the character processor 37 through connections 39 and connector 40 whereupon a computation is effected to derive a corrected value representing the position of the writing implement and hence the character being written.

When the writing implement is contacted, for example, at point 100 in FIG. 4, the voltages in each of the two dimensions are measured. The measured voltages are used to determine the nearest four reference points for which correction factors are stored in the PROM. A two dimensional linear interpolation may be used to derive a correction factor for contact point 100. Other derivation methods may be used to determine the correction factor, but this simple technique will provide reasonably accurate positioning.

For example, binary numbers are stored which would produce the following positional correction factors in inches:

| Point | Correction factor in inches |
|-------|------------------------------|
| 20    | x +0.100                     |
|       | y +0.025                     |
| 21    | x +0.090                     |
|       | y +0.010                     |
| 30    | x +0.085                     |
|       | y −0.005                     |
| 29    | x +0.092                     |
|       | y +0.008                     |

If from the voltage measured at point 100 we surmise (without the benefit of correction factors applied) that it's y position is two thirds of the way from point 29 to point 30 then the correction factor interpolated from the above indicated corrections would be:

x+0.089 y+0.004

If the measured voltages for reference point 100 were erroneous, the derived correction factor would be only approximate. The adjusted calculated position is closer to the true position, but for additional accuracy the calculations may be applied iteratively to obtain an even more accurate correction factor. Once the correction factor is calculated, it is added to the coordinate. Typical maximum correction factors stored in the memory correspond to positional errors of not more than 0.1 to 0.25 inches. If there is no positional error at a given reference point, the correction factor is 0. In this way, the improvement in error can be a factor of approximately 10 over a noncorrected pad.

Typically, in the high resistivity layer, the variations change gradually and smoothly from point to point across the pad. This is a characteristic resulting from the fabrication of the layer using the screen printing process.

While in the foregoing there has been provided a detailed description of a particular embodiment of the present invention, it is to be understood that all equivalents obvious to those skilled in the art are to be included within the scope of the invention as claimed.

What is claimed is:

1. The method of generating an electrical signal representative of the actual position of a moveable member comprising, in combination, the steps of
    applying an electrical potential across a substantially planar resistive sheet to establish a current flow through said sheet,
    measuring the electrical potential induced by said current at each of a plurality of predetermined positions on said surface,
    calculating, for each given one of said predetermined positions, a correction factor which relates the potential measured at said given position with the potential to be expected as said given position,
    storing each of said calculated correction values in a digital memory,
    measuring the magnitude of the potential on said sheet at the position of said moveable member, and
    combining said magnitude with at least one of said stored correction values to produce said signal representative of said actual position.

2. The method as set forth in claim 1 wherein said steps of applying, measuring, calculating and storing are repeated for a second electrical current induced in said sheet in a direction substantially perpendicular to said current flow to create a pair of correction factors at each of said given points and wherein said step of combining accordingly produces a pair of signals representing the two-dimensional coordinates of said actual position.

3. The method as set forth in claims 1 or 2 wherein said digital memory takes the form of a programmable read only memory.

4. Apparatus for generating an electrical signal representative of the two-dimensional positional coordinates of a moveable member comprising, in combination,
    a substantially rectangular planar resistive sheet having a relatively high resistivity and having a border of relatively lower resisitivity formed of pairs of opposed electrical connections,
    switching means for repetitiously applying an electrical potential to alternate ones of said pairs of connections to establish two alternating orthogonal currents through said sheet,
    means for obtaining a measured electrical potential induced by each of said currents at each of a plurality of predetermined positions on said surface,
    means responsive to said measured potentials for deriving, for each given one of said predetermined positions, a pair of correction values which relate the two potentials measured at said given position as induced by said two orthogonal currents with the potentials to be expected as said given position, a digital memory for storing each of said calculated correction values, means for measuring the magnitudes of the potentials on said sheet induced by said two orthagonal currents at the position of said moveable member, and computing means for combining said magnitudes with selected ones of said stored correction values to produce said electrical signal representative of the positional coordinates of said movable member.

* * * * *